US010671596B1

(12) United States Patent
Natanzon et al.

(10) Patent No.: US 10,671,596 B1
(45) Date of Patent: Jun. 2, 2020

(54) CONSISTENCY DETERMINATION

(71) Applicant: EMC Corporation, Hopkinton, MA (US)

(72) Inventors: Assaf Natanzon, Tel Aviv (IL); Leehod Baruch, Rishon Leziyon (IL); Jehuda Shemer, Kfar Saba (IL); Saar Cohen, Moshav (IL); Slavik Neymer, Petah Tikva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 681 days.

(21) Appl. No.: 14/674,241

(22) Filed: Mar. 31, 2015

(51) Int. Cl.
*G06F 16/00* (2019.01)
*G06F 16/23* (2019.01)
*G06F 11/14* (2006.01)
*G06F 11/16* (2006.01)
*G06F 11/30* (2006.01)

(52) U.S. Cl.
CPC ...... *G06F 16/2365* (2019.01); *G06F 11/1407* (2013.01); *G06F 11/1446* (2013.01); *G06F 11/1604* (2013.01); *G06F 11/3075* (2013.01); *G06F 2201/84* (2013.01)

(58) Field of Classification Search
None
See application file for complete search history.

(56) References Cited

U.S. PATENT DOCUMENTS

| 8,341,458 | B2* | 12/2012 | Butterworth | G06F 11/2064 |
| | | | | 707/622 |
| 8,401,997 | B1* | 3/2013 | Tawri | G06F 11/2064 |
| | | | | 707/655 |
| 2003/0152110 | A1* | 8/2003 | Rune | H04J 3/0682 |
| | | | | 370/509 |
| 2004/0205372 | A1* | 10/2004 | Moser | G06F 11/1683 |
| | | | | 714/1 |
| 2004/0267823 | A1* | 12/2004 | Shapiro | G06F 16/10 |
| 2005/0201421 | A1* | 9/2005 | Bhandari | H04J 3/0682 |
| | | | | 370/519 |
| 2009/0300304 | A1* | 12/2009 | Boyd | G06F 17/30575 |
| | | | | 711/162 |
| 2010/0073043 | A1* | 3/2010 | Bogenberger | H04J 3/0641 |
| | | | | 327/144 |
| 2010/0246442 | A1* | 9/2010 | Wang | H04W 16/14 |
| | | | | 370/254 |
| 2012/0226877 | A1* | 9/2012 | Clayton | G06F 11/1456 |
| | | | | 711/162 |
| 2014/0298092 | A1* | 10/2014 | Boldo | G06F 11/1471 |
| | | | | 714/20 |

(Continued)

Primary Examiner — Diedra McQuitery
(74) Attorney, Agent, or Firm — Krishnendu Gupta; Deepika Bhayana; Dorothy Chiang

(57) ABSTRACT

A method, system, and computer program product for determining a consistent point in time in a replication environment comprising determining periods of time that no IO was received from sources; wherein the periods are determined to account for differences between the clocks of the sources and the clock at a replication appliance, adjusting the periods of time that no IO was received by at least one delay factor, comparing the adjusted periods of time from the sources to determine a common period of time; wherein the common point in time denotes that each source was in a consistent state and marking the adjusted point in time as a consistent point in time in a journal.

18 Claims, 16 Drawing Sheets

(56) References Cited

U.S. PATENT DOCUMENTS

2014/0372374 A1* 12/2014 Bourbonnais ..... G06F 17/30575
    707/613
2015/0254296 A1* 9/2015 Bourbonnais ....... G06F 16/2282
    707/675

* cited by examiner

FIG. 12

QUIET TIMES 1201
- HYPERVISOR 1210 — QUIET TIME T6-T15  1241
- HYPERVISOR 1211 — QUIET TIME T7-T21  1242
- HYPERVISOR 1212 — QUIET TIME T9-T23  1243

OFFSETS 1202
- HYPERVISOR 1210 — OFFSET 1  1251
- HYPERVISOR 1211 — OFFSET 3  1252
- HYPERVISOR 1212 — OFFSET 2  1253

ADJUSTED QUIET TIMES 1203
- HYPERVISOR 1210 — QUIET TIME T5-T14  1262
- HYPERVISOR 1211 — QUIET TIME T4-T18  1262
- HYPERVISOR 1212 — QUIET TIME T7-T21  1263

ADJUSTED QUIET TIMES 1204
- HYPERVISOR 1210 — QUIET TIME T5-T14  1272
- HYPERVISOR 1211 — QUIET TIME T4-T18  1273
- HYPERVISOR 1212 — QUIET TIME T7-T21  1274

ERROR FACTOR 1205
- HYPERVISOR 1210 — ERROR +-1  1281
- HYPERVISOR 1211 — ERROR +-2  1282
- HYPERVISOR 1212 — ERROR +-1  1283

ACTUAL QUIET 1206
- HYPERVISOR 1210 — QUIET TIME T6-T13  1291
- HYPERVISOR 1211 — QUIET TIME T6-T16  1292
- HYPERVISOR 1212 — QUIET TIME T8-T20  1293

CONSISTENT TIME T8-T13  1290

CONSISTENCY DETERMINATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

This Application is related to U.S. Pat. No. 9,875,042, entitled "ASYNCHRONOUS REPLICATION" and U.S. Pat. No. 10,067,694, entitled "REPLICATION ORDERING".

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations may afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site may recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system, and computer program product for determining a consistent point in time in a replication environment comprising determining periods of time that no IO was received from sources; wherein the periods are determined to account for differences between the clocks of the sources and the clock at a replication appliance, adjusting the periods of time that no IO was received by at least one delay factor, comparing the adjusted periods of time from the sources to determine a common period of time; wherein the common point in time denotes that each source was in a consistent state and marking the adjusted point in time as a consistent point in time in a journal.

BRIEF DESCRIPTION OF THE DRAWINGS

The present invention will be more fully understood and appreciated from the following detailed description, taken in conjunction with the drawings in which:

FIG. 12 is a simplified illustration of a calculation of a consistent time for a replication environment, in accordance with an embodiment of the present disclosure;

DETAILED DESCRIPTION

Figure 1:
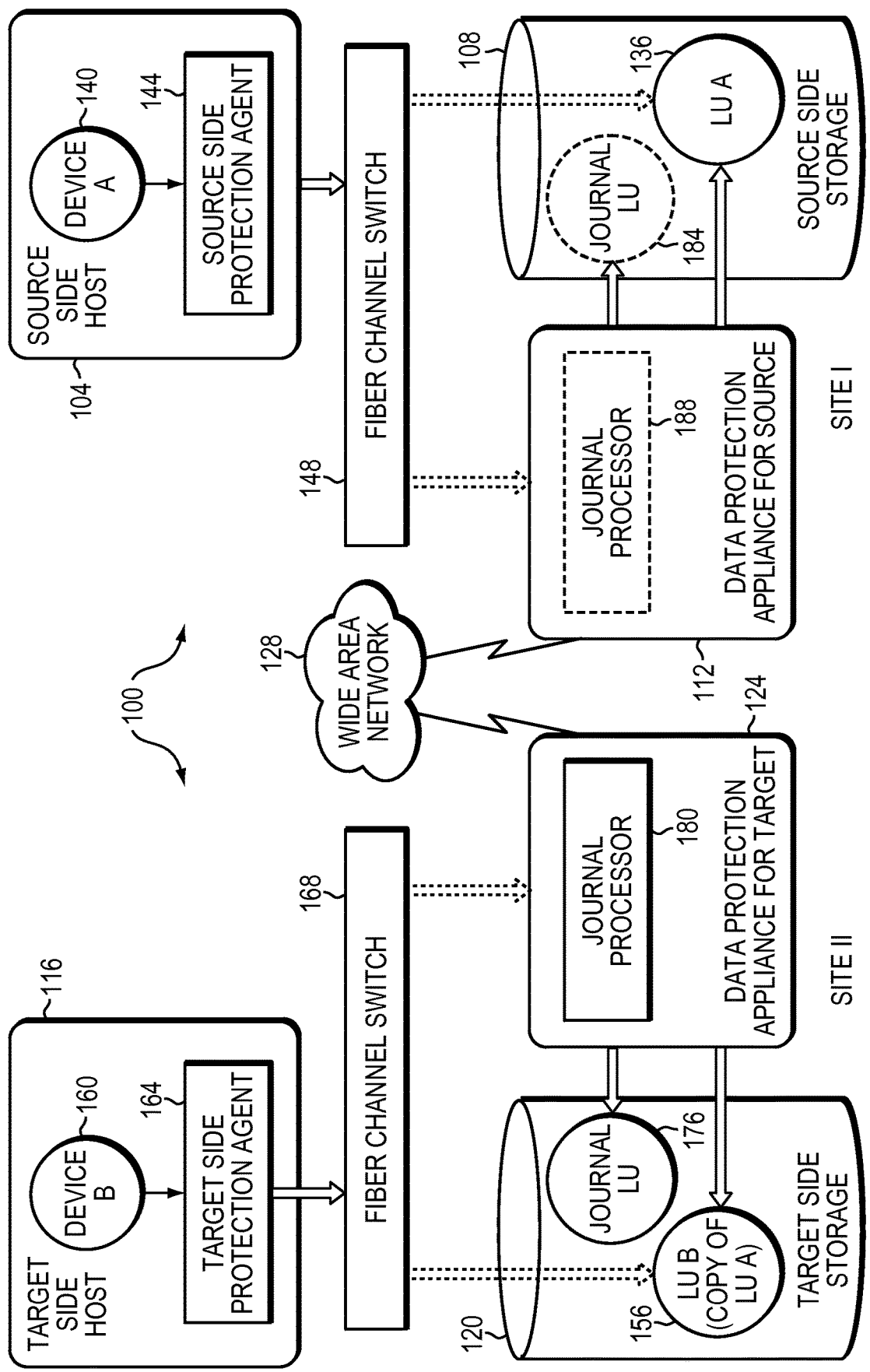
FIG. 1 is a simplified illustration of a data protection system, in accordance with an embodiment of the present disclosure.

Typically, in a replication environment, a way to determine when data is consistent is to cause the data to be consistent by quiescing or stopping host IOs and mark those times as consistent. Generally, another way to determine when data is consistent is to wait for long enough periods of quiet (i.e. an implicit quiesce) and mark those as consistent. Usually, in a distributed system that has multiple sources of IOs, synchronizing a quiesce across one or more hosts or even synchronizing clocks in real time to detect quiet times is a challenge. Conventionally, if a replication environment has a consistency group then further complexity is added to determining when the data is consistent. Typically, this may become even more complex in a "true asynchronous" replication scheme where IOs are sent to the storage in parallel to the replication appliance as there may be no way to determine the ordering of IOS to establish write order fidelity. Conventionally, there may not be a way to ensure a synchronized quiesce/quiet time to determine WOF across volumes.

In many embodiments, the current disclosure may enable asynchronous replication that does not require an acknowledgement from a protection appliance before an acknowledgement is sent back to an IO source such as a host. In certain embodiments, a delta marker file in a splitter may track IO that has occurred. In other embodiments, a backlog in a replication appliance may track IO that occurred.

In certain embodiments, the current disclosure may enable determination of consistent points in time in a replication environment after the consistent point in time has occurred without needing to quiesce the replication. In a particular embodiment, the current disclosure may enable determination of consistent points in time in a virtual environment where there are multiple VMs on different hypervisors or ESXs, and these hypervisors or ESXs are replicated together in the same consistency group (CG). In an alternative environment, multiple volumes in a CG on a storage system with multiple directors, such as for example EMC®'s VMAX, or multiple storage systems, where IOs to the same volumes are handled by separate splitters. In further embodiments, a replication appliance, such as EMC's RecoverPoint, may communicate with splitters in the replications system and may be aware of the splitters state and time.

In some embodiments, a central location such as a protection appliance, may determine the time or internal clock time of each source of IOs. In many embodiments, a central location or replication appliance may calculate the time offset of each of the IO sources relative to a single time reference such as the time of the central location or the protection appliance.

In most embodiments, the central location or protection appliance may track the IO data stream by using the time of the central location or protection appliance, such as the time marked in a protection journal. In certain embodiments, a splitter for each IO source may send the central location or protection appliance a stream of "quiet times" per volume being replicated greater than a predetermined amount of time during which no IOs were split. In certain embodiments, the predetermined amount of time may account for communication errors. In other embodiments, the predetermined amount of time may be large enough that other IO sources also have quiet times during this period. In certain embodiments, the current disclosure may enable calculation of a common IO time relative to all IO sources.

In certain embodiments, a calculation of a common IO time may include a delay figure or amount. In other embodiments, a calculation of a common IO time may include an error figure. In further embodiments, the calculation of a common IO time may include an offset calculation. In still further embodiments, the calculation of a common IO time may include another figure or input. In most embodiments, a common IO time may be a time which orders IO received by IO sources in a common time frame accounting for differences between the clocks of the IO sources. In many embodiments, the predetermined amount of time may be an amount of time that enables the protection appliance to generate a quiet time for the volume accounting for delays and calculation errors. In certain embodiments, each respective splitter may send notification of a quiet time, with no active IO being split, after a given period of time and may periodically send updates to the central location or protection appliance to note that the quiet time has continued. In many embodiments, the current disclosure may enable write order fidelity across multiple IO sources. In further embodiments, each source or splitter may periodically notify a central device or protection appliance of periods in which no communication errors occurred between the source or splitter and the central location or protection appliance.

In certain embodiments, the central location or replication appliance may receive the notification from respective splitters indicating a quiet time or cessation of IOS and may calculate the offset time between the respective clock of the splitter or source and the rime of the central location or replication appliance. In most embodiments, the central location or replication appliance may use knowledge of splitter time and offset to align timestamps of all streams to one central time line using a clock of the central location or the splitter.

In certain embodiments, the central location or replication appliance may determine across all volumes in the consistency group times where all volumes are mutually quiet and mark those points in time as consistent retroactively in a journal stream. In many embodiments, the period of mutual quiet across sources may need to be long enough to determine consistency of the sources and to compensate for inaccuracies in a calculation of time offsets of the splitters.

In a further embodiment, a splitter for a source may not send a notification that a quiet time has occurred but may send a notification that there were no IO communication errors per volume between the splitter and the central location or protection appliance. In some embodiments, a central location or protection appliance may be able to determine quiet times of sources using a journal log of IO compiled by the protection appliance or central location and the notice of no errors or maximum IO delay per volume. In many embodiments, a central location or protection appliance may determine quiet times by noting when splitters have not sent IO to the central location, time adjusted to the central clock of the central location or replication appliance, and the acknowledgement that no communication errors, such as lost or incorrect IO, have occurred between the splitter and protection appliance.

The following may be helpful in understanding the specification and claims:

BACKUP SITE—may be a facility where replicated production site data is stored; the backup site may be located in a remote site or at the same location as the production site; a backup site may be a virtual or physical site CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA. A RPA or DPA may also be referred to herein as a replication appliance or a protection appliance.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more disk, virtual disks or virtual LUNs, which may correspond to one or more Virtual Machines. LUN may be used interchangeably with LU herein.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system; may be a virtual or physical site SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site WAN—may be a wide area network that connects local networks and enables them to communicate with one another, such as the Internet.

SPLITTER/PROTECTION AGENT: may be an agent running either on a production host a switch, a storage array, a virtual machine, hypervisor, or other portion of an IO pathe, which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines.

VIRTUAL VOLUME: may be a volume which is exposed to host by a virtualization layer, the virtual volume may be spanned across more than one site and or volumes VASA: may be a set of vCenter providers that allow an administrator to manage storage Virtualization filter appliance (VFA): may be a layer in the hypervisor that has the ability intercepts and split IO from a VM being written to a virtual disk. In some embodiments, the VFA may be running on a VM in a hypervisor This is an out of mechanism that allows storage management over web based APIs.

VVOL-filter—may be a VM utilizing a specialized Virtual machine, which may provide an infrastructure that allows for introducing a "device driver" into the virtualized IO stack provided by the Virtual machine Virtual RPA (vRPA)/Virtual DPA (vDPA): may be a data protection appliance (DPA), which also may be referred to herein as a replication protection appliance, running in a VM or a hypervisor.

VASA may be vSphere Storage application program interfaces (APIs) for Storage Awareness.

DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

A discussion of journal based replication may be integrated with a virtual service layer. may be found in U.S. patent application Ser. Nos. 13/077,256, 13/077,262, and 13/077,266, entitled "CONSISTENT REPLICATION IN A GEOGRAPHICALLY DISPERSE ACTIVE ENVIRONMENT," "INVERSE STAR REPLICATION," and "NETWORKED BASED REPLICATION OF DISTRIBUTED VOLUMES," respectively, filed on Dec. 16, 2010 assigned to EMC Corp., which is hereby incorporated by reference.

A discussion of virtual replication may be may be found in U.S. patent application Ser. No. 13/599,492, entitled "MULTI SITE AND MULTI TENANCY," filed on Aug. 30, 2012 assigned to EMC Corp., which is hereby incorporated by reference.

Embodiment of a Replication System

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (splitter) may run on the host, or on the storage, or in the network, and that DPAs are optional and DPA code may run on the storage array too.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system or on the storage system itself.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124. For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal.

Figure 2:
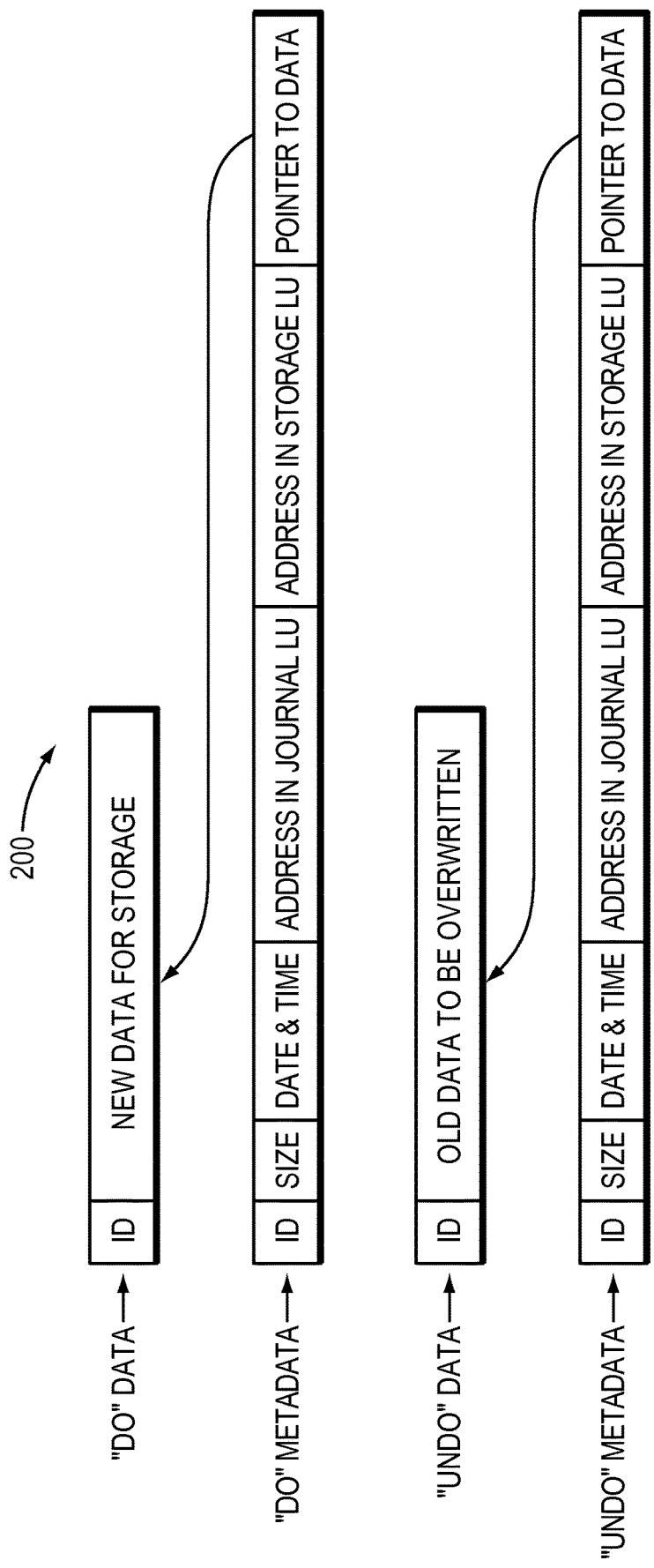
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
  one or more identifiers;
  a time stamp, which is the date & time at which the transaction was received by source side DPA 112;
  a write size, which is the size of the data block;
  a location in journal LU 176 where the data is entered;
  a location in LU B where the data is to be written; and
  the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

Asynchronous Data Replication

Figure 3:
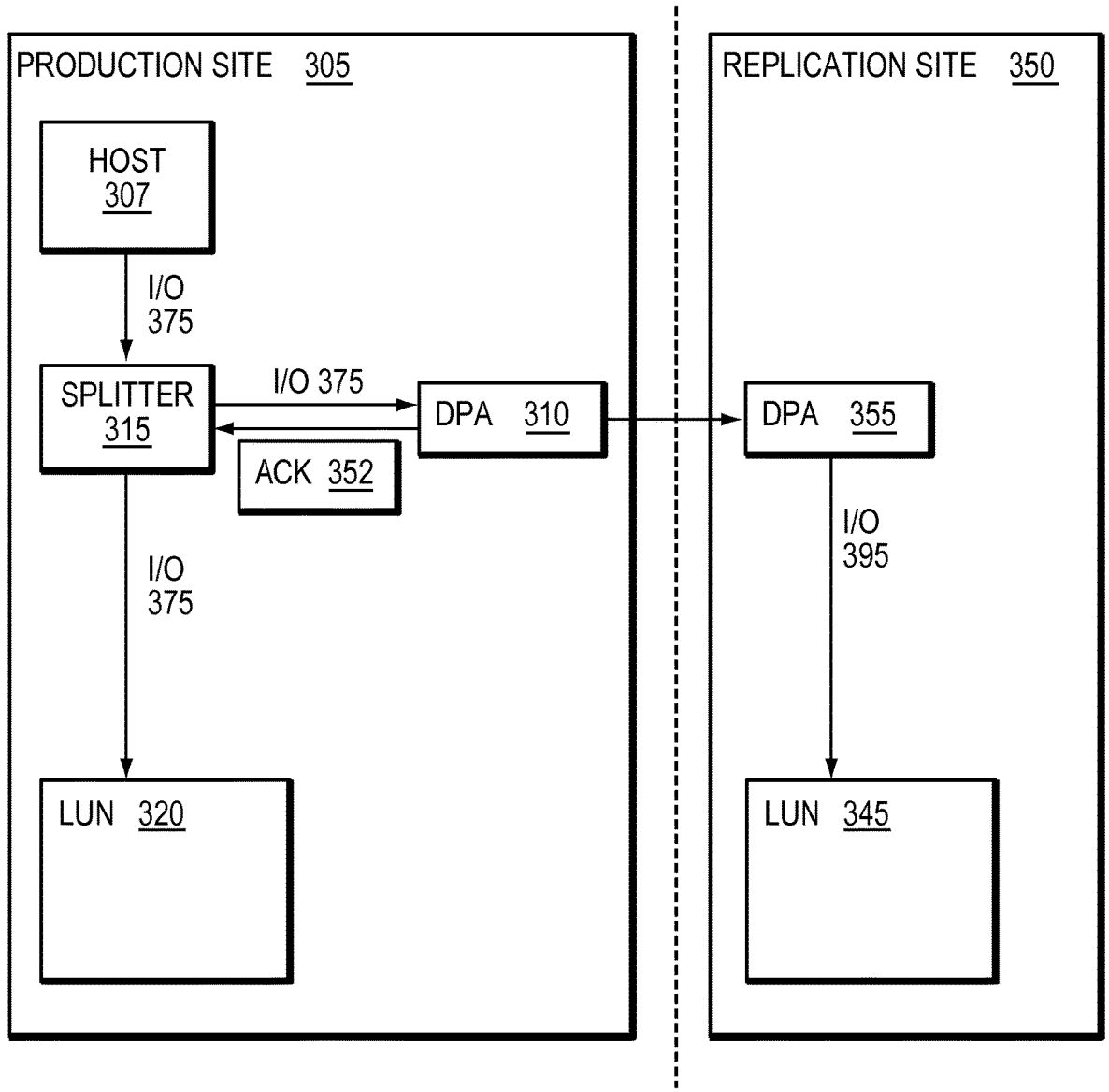
FIG. 3 is an alternative simplified illustration of a data protection system, in accordance with an embodiment of the present disclosure.
Figure 4:
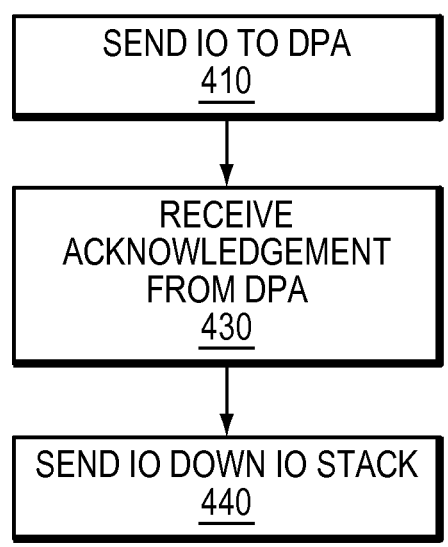
FIG. 4 is a simplified example of a method for data replication, in accordance with an embodiment of the present disclosure.

Refer now to the embodiments of FIGS. 3 and 4. Splitter 315 receives IO 375 from Host 307. Splitter 315 sends IO 375 to DPA 310 (step 410). DPA 310 sends acknowledgement 352 to splitter 315 (step 430). Splitter 315 sends IO 375 to Storage array 360 (step 440).

In further embodiments, when in asynchronous data replication mode, there may be an increased chance of data loss. In some embodiments, data loss may occur as the acknowledgement of receipt of an I/O has been logged, before the I/O may be written to the a DPA. In further embodiments, if there is a crash between the acknowledgement and when the I/O is written, this data may be lost. In some embodiments, asynchronous data replication may be useful when latency does not allow synchronous replication or when some small amount of data loss is allowed.

In alternative embodiments, asynchronous data replication may offer the ability to run the production site with little or no slowing due to data protection requirements. This may be because replication requirements, in terms of data needed to be replicated, may not be constant and may fluctuate. Asynchronous data replication may offer a buffer or lag which may buffer data replication, allowing it to build up during heavy replication periods and allowing it to catch up during lighter replication periods.

Data Replication

Figure 5:
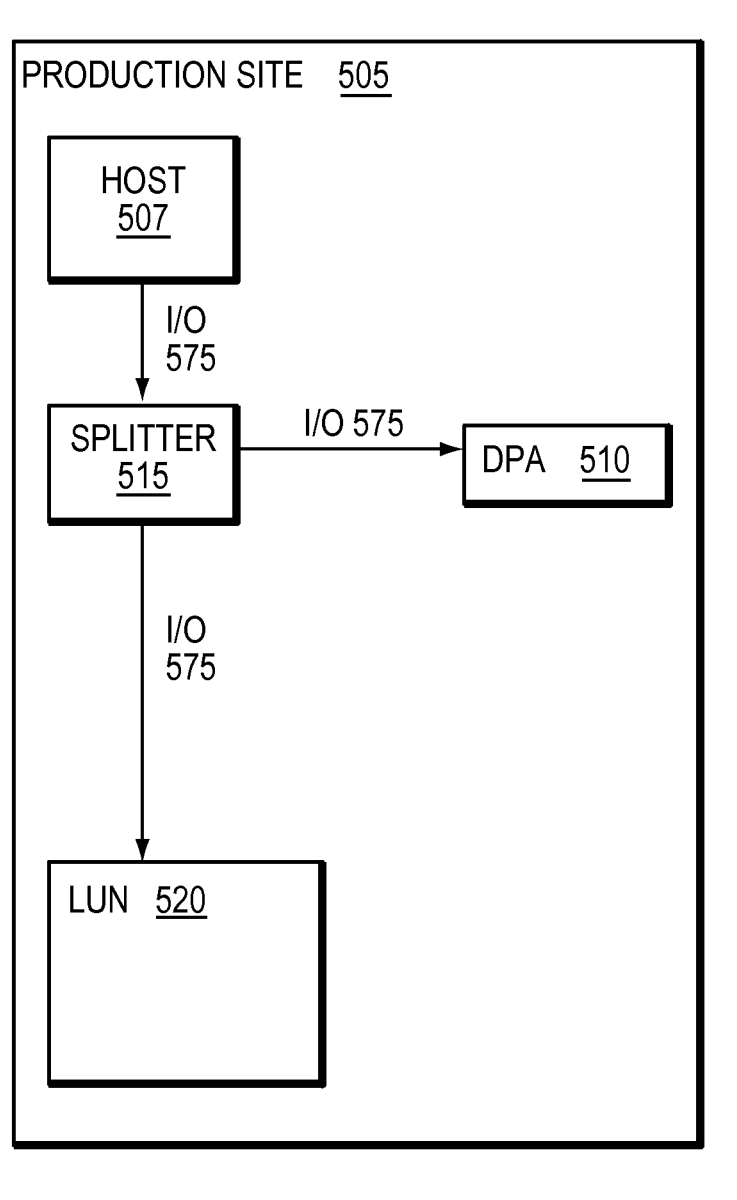
FIG. 5 is a further alternative simplified illustration of a data protection system, in accordance with an embodiment of the present disclosure.
Figure 6:
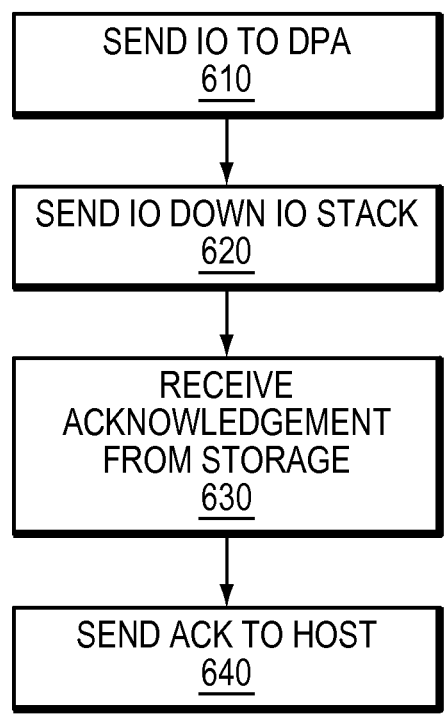
FIG. 6 is a simplified example of a method for data replication without waiting for acknowledgement from a replication appliance, in accordance with an embodiment of the present disclosure.

Refer now to the example embodiment of FIGS. 5 and 6, which illustrate replication where a splitter does not wait for an acknowledgement from a data protection appliance before allowing the splitter to send IO down the IO stack. Production site 505 has host 507, splitter 515, DPA 510, and LUN 520. Splitter 515 sends IO 575 to DPA 510 (step 610). Splitter 515 sends IO 575 down the IO stack (step 620). Splitter 515 receives acknowledgement from storage 520 (step 630). Splitter 515 sends acknowledgement to host 505 (step 640).

Lossless Consistent Points in Time

Figure 7:
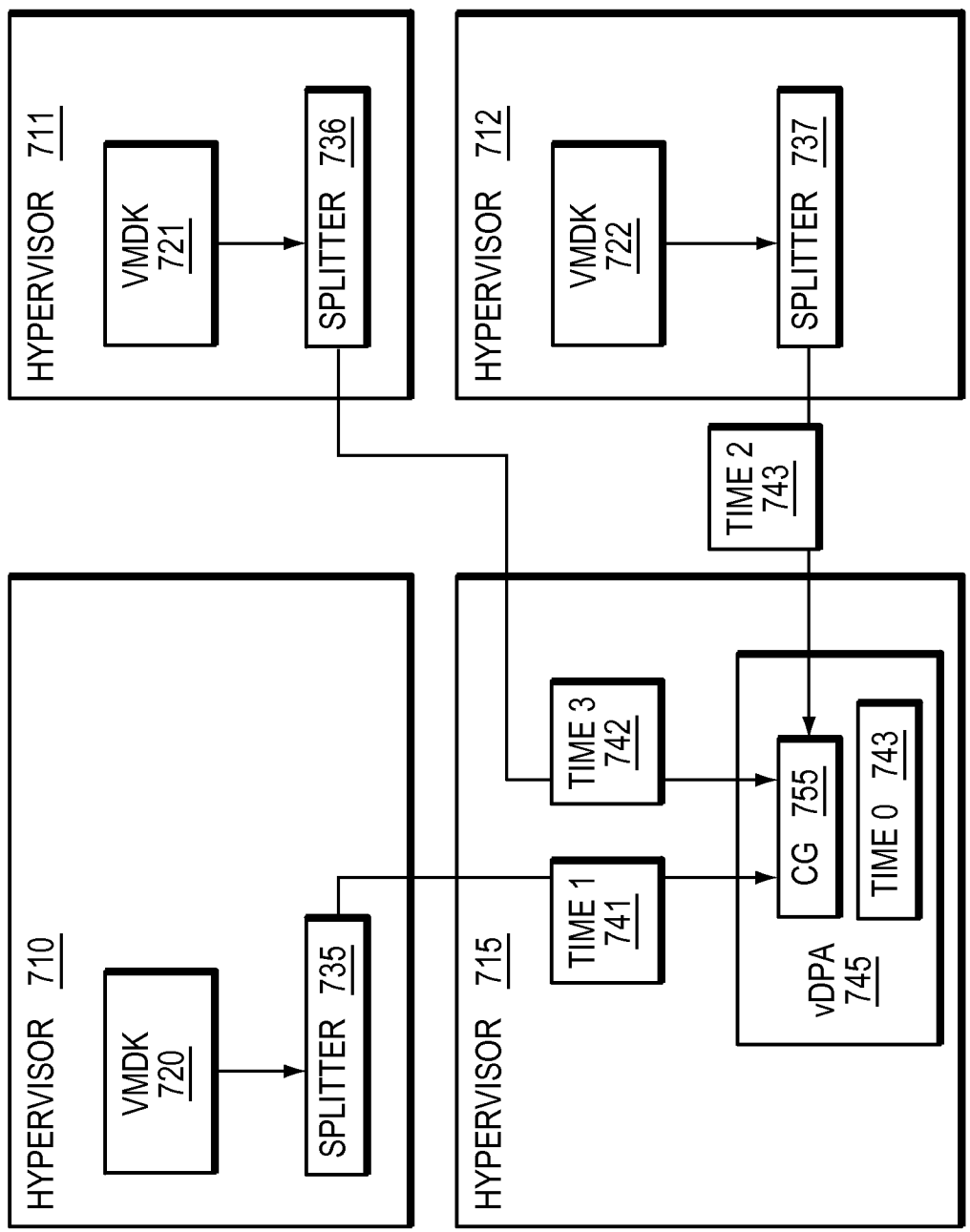
FIG. 7 is a simplified illustration of a data protection system in a virtual environment, in accordance with an embodiment of the present disclosure.

Refer now to the example embodiment of FIG. 7, which illustrates multiple sources being split to a replication appliance. In this embodiment, there are four hypervisors, hypervisors 710, hypervisors 711, hypervisors 712, and hypervisors 715. Hypervisor 710 has VMDK 720 which is being split to splitter 735. Hypervisor 711 has VMDK 721 which is being split to splitter 736. Hypervisor 713 has VMDK 722 which is being split to splitter 737. Splitter 735 splits IO to vDPA 745. Splitter 736 splits IO to vDPA 745. Splitter 737 splits IO to vDPA 745. vDPA 745 replicates volumes 720, 721, and 722 as consistency group 755. Splitter 735 has an internal clock, which is at time 1 741. Splitter 736 has an internal time which is at time 3 742. Splitter 737 has an internal time 2 743. vDPA 745 has an internal time 0 743. In alternative embodiments, the splitters may not have a time but the splitter time may represent the time of the IO source. In further embodiments, the hypervisors may be any type of IO source such as a director, host, or other device.

Figure 8:
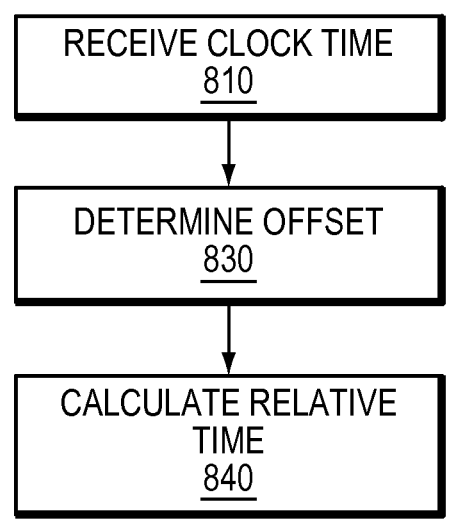
FIG. 8 is a simplified example of a method for calculating a common clock time, in accordance with an embodiment of the present disclosure.
Figure 9:
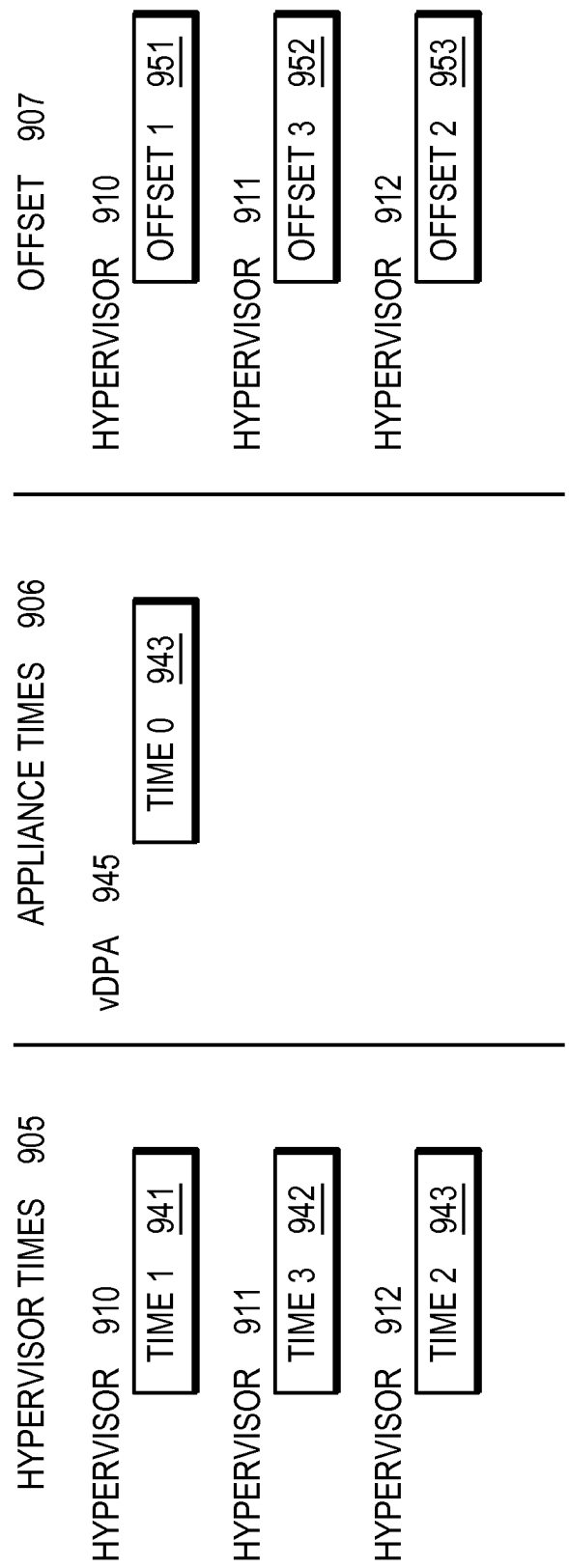
FIG. 9 is a simplified illustration of calculating clock offsets, in accordance with an embodiment of the present disclosure.

Refer as well to FIG. 8. vDPA 745 receives the clock times for splitters 735, 736, and 737 (step 810). vDPA 745 determines the offset for each splitter's time (step 830). vDPA 745 calculates the relative time of the splitters (step 840). Now refer as well to the example embodiment of FIG. 10. The column hypervisor times 905 indicates the internal clock time of each hypervisor, respectively time 1, time 3, and time 2. Column Appliance time 906 shows the internal clock time of the data protection appliance at time T0. Column Offset 907 shows the offset for each hypervisor's internal clock relative to the time of the data protection appliance.

Figure 10:
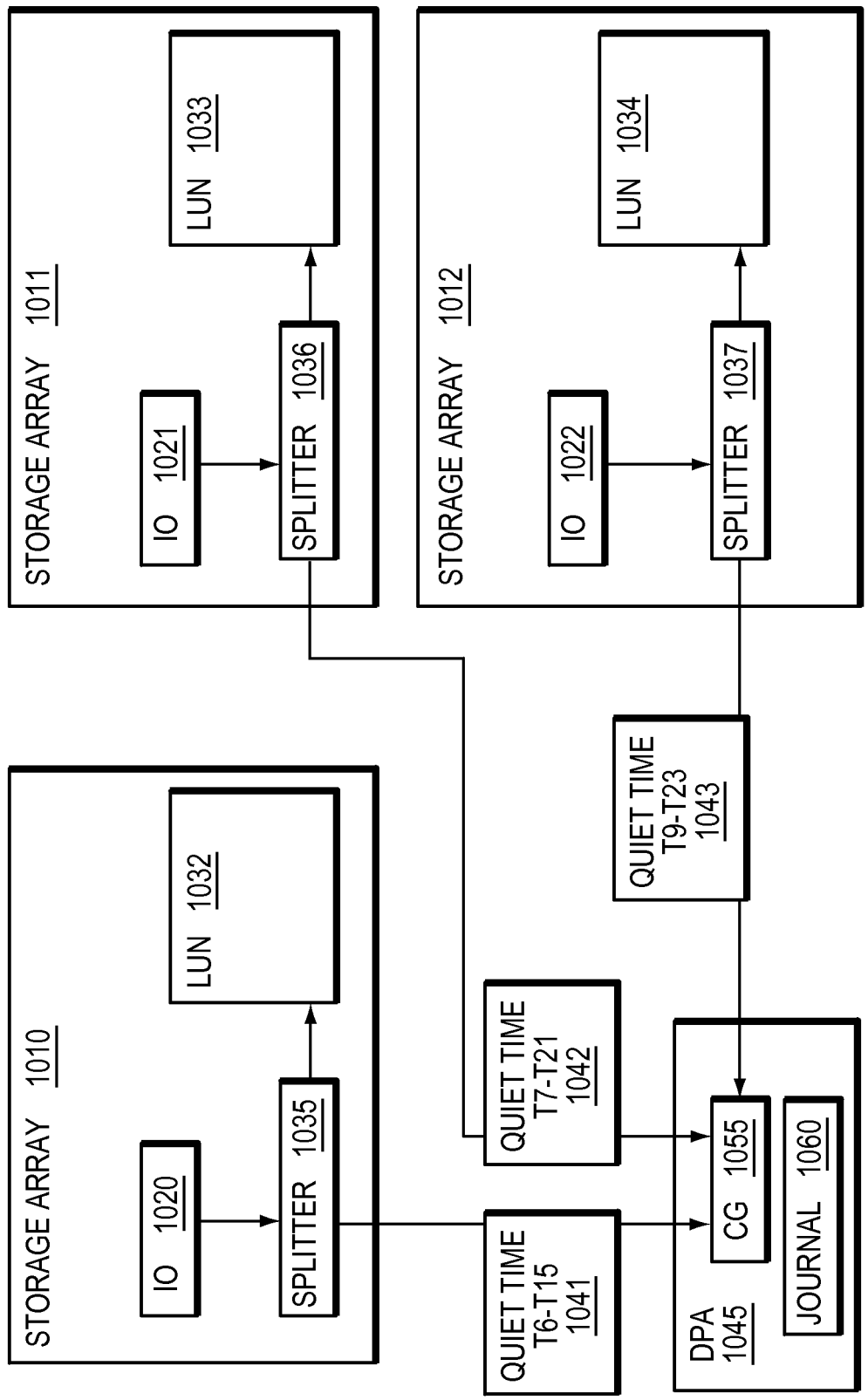
FIG. 10 is a simplified illustration of sending quiet times to a data protection appliance in a data protection system, in accordance with an embodiment of the present disclosure.

Refer to the example embodiment of FIG. 10, which illustrates multiple sources being split to a replication appliance, in this embodiment the sources are storage arrays. In this example embodiment there are three storage arrays, storage array 1010, storage array 1011, and storage array 1012, which are being replicated by data protection appliance (DPA) 1045. DPA 1045 has access to journal 1060 and replicates the storage arrays as part of consistency group 1055. Storage array 1010 has IO 1020 which is split by splitter 1035 to LUN 1032 and DPA 1045. Storage array 1011 has IO 1021 which is split by splitter 1036 to LUN 1033 and DPA 1045. Storage array 1012 has IO 1022 which is split by splitter 1037 to LUN 1034 and DPA 1045.

Figure 11:
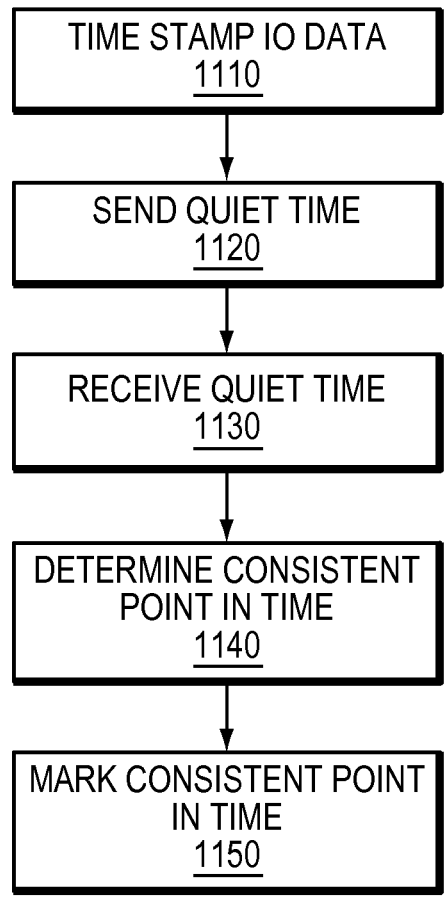
FIG. 11 is a simplified example of a method for determining a consistent point in time in a replication environment, in accordance with an embodiment of the present disclosure.

Refer as well to FIG. 11. In the example embodiments of FIGS. 10 and 11, DPA 1045 timestamps data received IO data from splitter 1035, splitter 1036, and splitter 1037 (step 1110). In this embodiment, the timestamp serves as a common reference for DPA 1045 to denote the time of the IO. In this embodiment, DPA 1045 has calculated the offset time between the clock of DPA 1045 and the IO sources of splitter 1035, splitter 1036, and splitter 1037. DPA receives quiet time 1041 from splitter 1035, quiet time 1042 sent from splitter 1036, and quiet time 1043 from splitter 1037 (steps 1120-1130). In this embodiment, the quiet time is a message sent from the splitter to the DPA which represents the time each splitter recorded as receiving no DO, where the time is based on the clock of the IO source, i.e. the message contains a time interval of no IOs. DPA 1045 determines a consistent point in time by converting the quiet time of each IO source into the quiet time of DPA 1045 by using an offset figure and error figure calculated for each IO source (step 1140), where the error may be the round trip time between the splitter and replication appliance or any other time measurement which take into calculation the time it take the IO to get from the splitter to the host. DPA 1150 marks the consistent point in time for consistency group 1055, which corresponds to a consistent point in time for each IO source (step 1150). In certain embodiments the offset may be calculated as illustrated in FIGS. 10 and 11.

Refer now to the example embodiment of FIG. 12 which illustrates calculated a quiet time for a consistency group. Column Quiet times 1201 outline the quiet times for hypervisors 1210, 1211, and 1212 as quiet times 1241, 1242, and 1243. Each quiet time represents a range of times, for example quiet time T6-T15 1241, for that respective hypervisor, hypervisor 1210, which represents a period of time where no IO has occurred for that hypervisor. Column Offsets 1202 represents the offset time between each hypervisor and a central clock time, such as that of a data protection appliance. In the embodiment of FIG. 12, hypervisor 1210 has an offset of 1 ms, 1251, hypervisor 1211 has an offset of 3 ms, 1252, and hypervisor 121 has an offset of 2 ms 1253. Column Adjusted Quiet times 1203 represents an adjusting of the quiet times of each hypervisor to that of a central clock time, such as the clock time of a data protection appliance. In this embodiment, the quiet time for hypervisor of T6-T15 1241 has been adjusted by offset 1 ms, 1251 to be Quiet Time T5-T14 1262. Similarly, the quiet times for hypervisor 1211 and 1212 have been adjusted to be T4-T18 1262 and T7-T21, respectively. Adjusted Quiet Times 1203 represent an adjustment based on the difference in internal clocks but does not include an adjustment based on error factors.

Adjusted Quiet Times 1204, which illustrates the adjusted quiet times from column 1203. Column Error Factor 1205 represents a communication round trip times for each hypervisor, which can cause clock skew in the calculations. Hypervisor 1210 has an error of +−1 ms, 1281. Hypervisor 1211 has an error of +−2 ms, 1282. Hypervisor 1212 has an error of +−1 ms, 1283. These error values represent an upper bound in the possible amount of time it take for a message to get from each respective hypervisor to the vDPA. Column Actual Quiet Time 1206 represents the error adjusted quiet times for each hypervisor. Hypervisor 1210 has an error adjusted quiet time of T6-T13, 1291. Hypervisor 1211 has an error adjusted quiet time of T6-T13, 1292. Hypervisor 1212 has an error adjusted quiet time of T6-T13, 1293. The actual quiet times of each hypervisor enable a calculation of a quiet time across all hypervisors. Consistent Time T8-T13 1290 represents a time when each hypervisor, hypervisor 1210, hypervisor 1211, and hypervisor 1212, has a common quiet time. Consistent Time 1290 is a time when the consistency group corresponding to the hypervisor may be marked as consistent. In other example embodiments, the hypervisors may be another type of IO source, such as a storage array, director, EMC VMAX, or EMC VPLEX.

Figure 13:
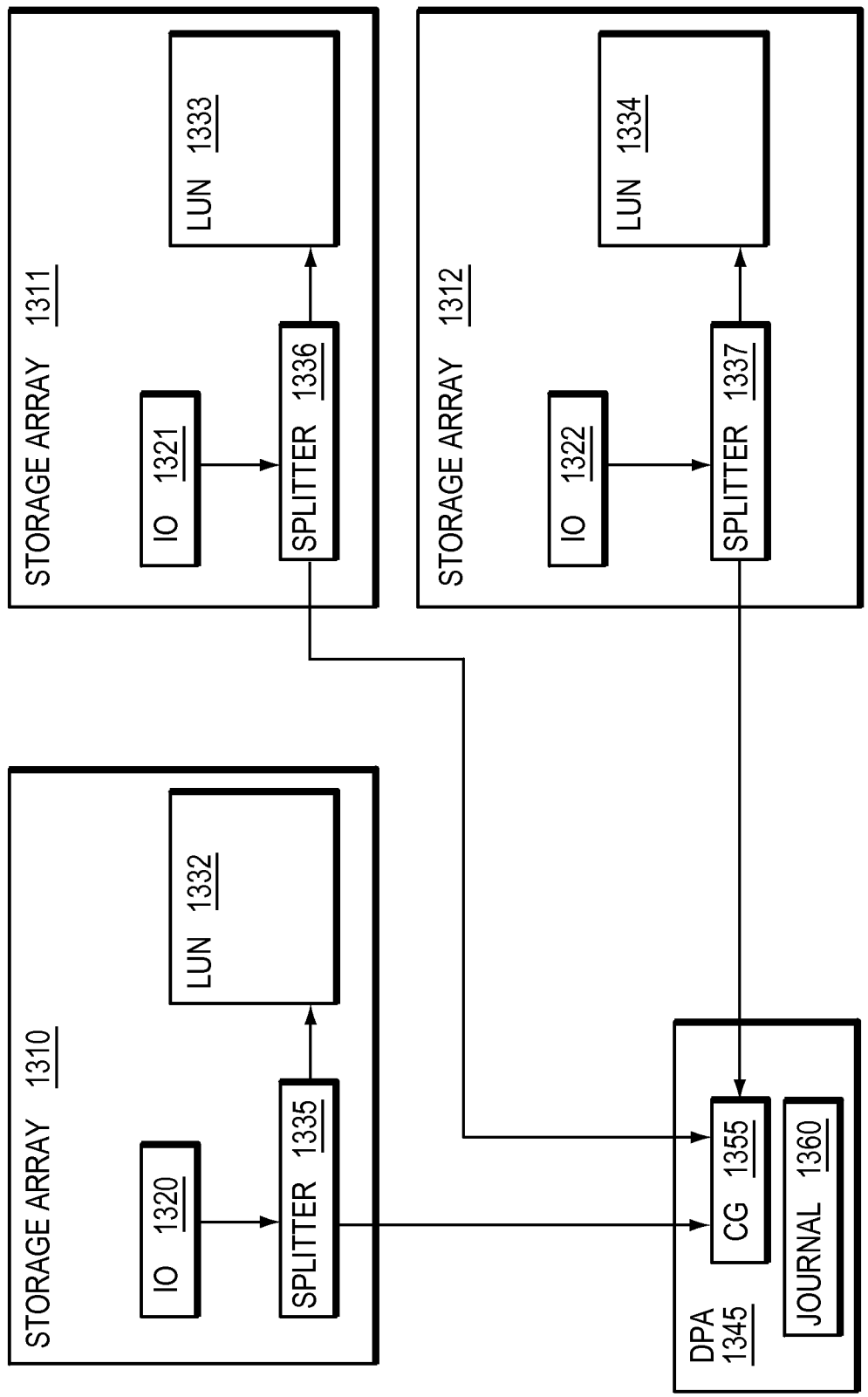
FIG. 13 is a simplified illustration of a data protection system, in accordance with an embodiment of the present disclosure.
Figure 14:
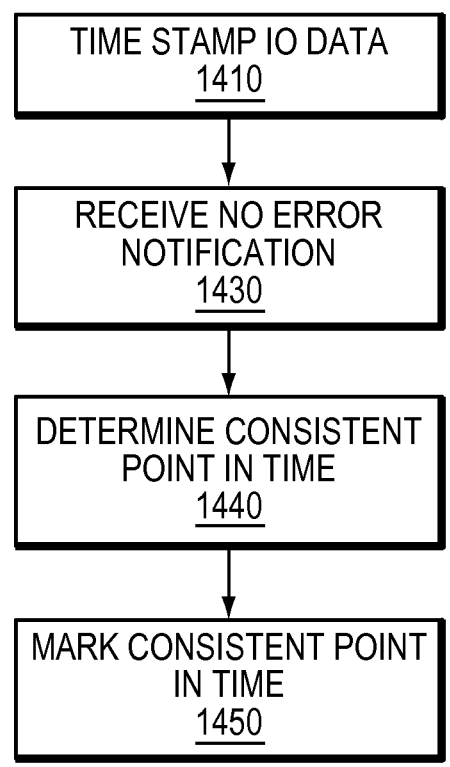
FIG. 14 is an alternative simplified example of a method for calculating a consistent point in time in a replication environment, in accordance with an embodiment of the present disclosure.

Refer now to the example embodiment of FIGS. 13 and 14, which illustrate an alternative embodiment of determining a consistent point in time. In these figures, there are storage array 1310, storage array 1311, and storage array 1312, which are being replicated by DPA 1345 as part of Consistency Group 1355. DPA 1345 has access to journal 1360. Each storage array also has IO, such as IO 1320 for storage array 1310, a splitter, such as splitter 1335 for storage array 1310, and a LUN, such as LUN 1332 for storage array 1310.

DPA 1345 time stamps IO data that it receives from each splitter on each storage array, such as IO 1320 from splitter 1335 on storage array 1310 (step 1410). DPA 1345 tracks when it receives notification from each splitter that no communication errors occurred for a given time period (step 1430). DPA 1345 determines a consistent point in time (1440). In this embodiment, DPA 1345 has access to journal 1360 that records the time stamped IO. DPA 1345 is able to examine journal 1360 to determine periods of the time where no IO was written to from any replicated LUN to the DPA. The periods of time where there is no storage IO may be considered consistent points in time. DPA 1345 combines these periods where there is no IO with the information that no communication errors occurred to determine consistent points in time. DPA 1345 marks the consistent points in time in journal 1360.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Figure 15:
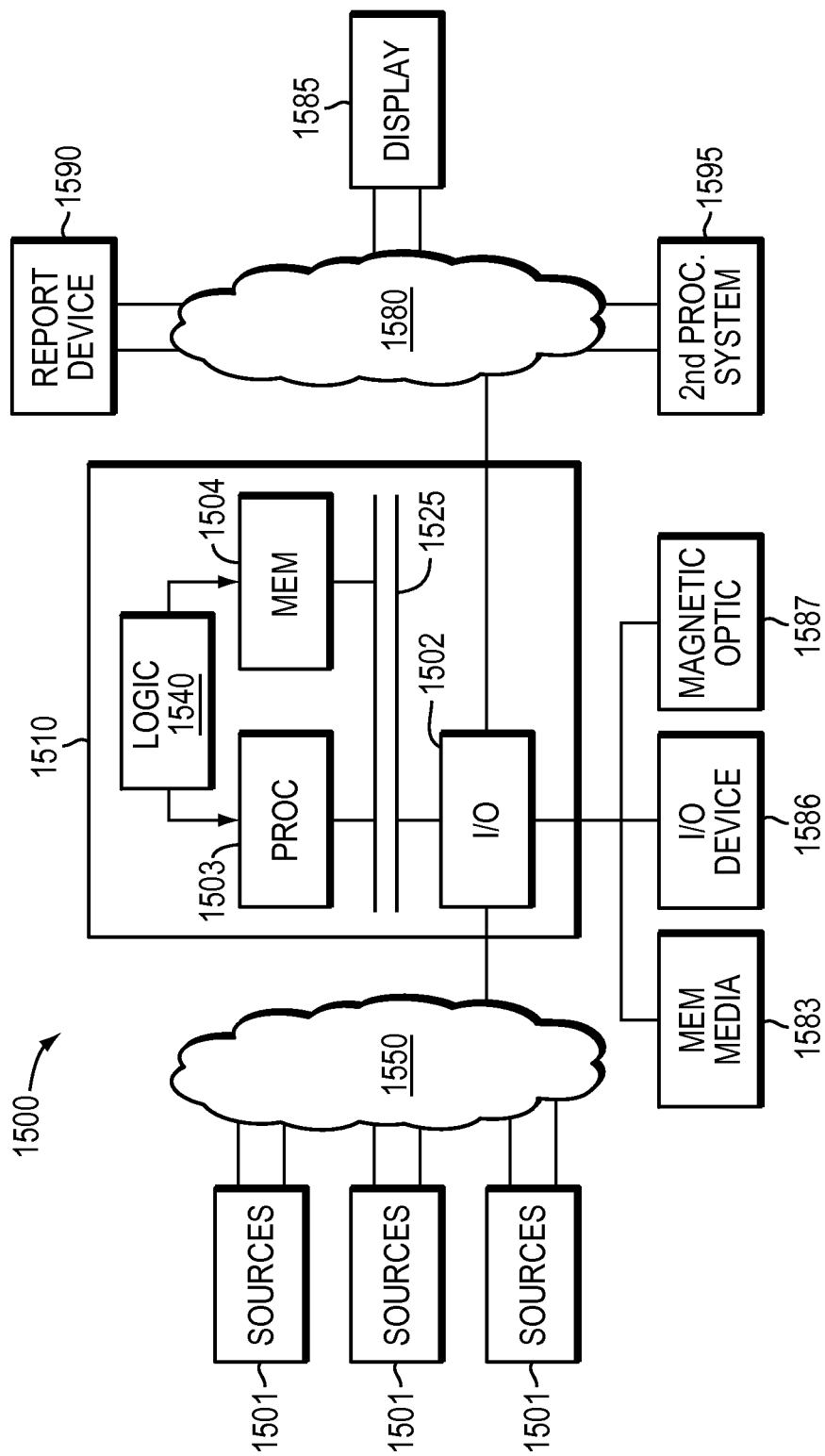
FIG. 15 is an example of an embodiment of an apparatus that may utilize the techniques described herein, in accordance with an embodiment of the present disclosure.
Figure 16:
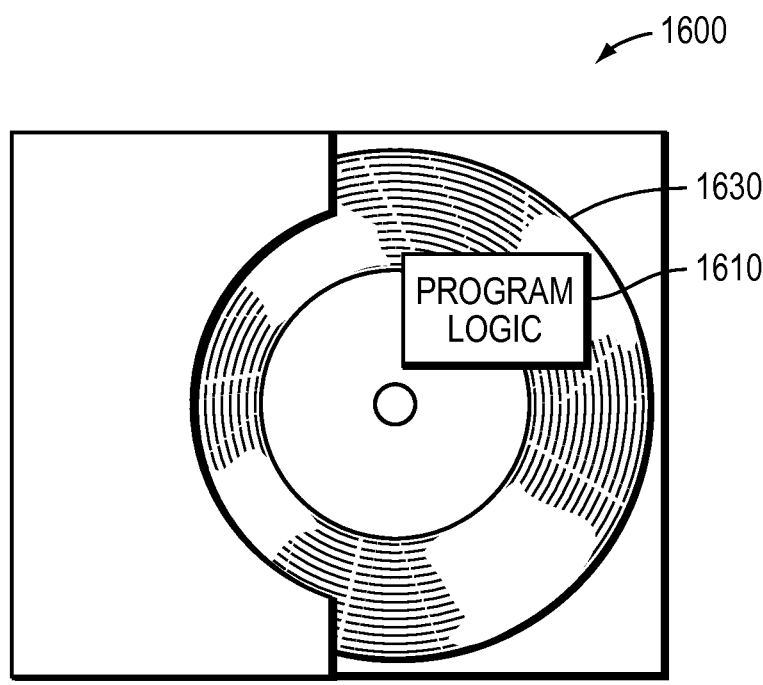
FIG. 16 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 15, the machine becomes an apparatus for practicing the invention. When implemented on one or more general-purpose processors, the program code combines with such a processor 1503 to provide a unique apparatus that operates analogously to specific logic circuits. As such a general purpose digital machine can be transformed into a special purpose digital machine. FIG. 16 shows Program Logic 1634 embodied on a computer-readable medium 1630 as shown, and wherein the Logic is encoded in computer-executable code configured for carrying out the reservation service process of this invention and thereby forming a Computer Program Product 1500. The logic 1634 may be the same logic 1540 on memory 1504 loaded on processor 1503. The program logic may also be embodied in software modules, as modules, or as hardware modules. The processors or machines may be embodied as one or more virtual processors or machines, respectively.

The logic for carrying out the method may be embodied as part of the system described below, which is useful for carrying out a method described with reference to embodiments shown in, for example, FIGS. 4, 6, 8, 9, 11, and 14.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A computer implemented method for retroactively determining a consistent point in time in a replication environment, wherein the replication environment comprises a replication appliance and a plurality of sources, comprising the steps of:
   receiving from each of the plurality of sources at the replication appliance a plurality of quiet periods, wherein the plurality of quiet periods correspond to a period of time when no IO was received at a respective source among the plurality of sources;
   determining at the replication appliance a clock offset for each of the plurality of sources wherein the clock offset is measured with respect to the clock at the replication appliance;
   adjusting the plurality of quiet periods by at least one error adjusted quiet time, based on the clock offset for the corresponding source, in order to obtain a plurality of adjusted quiet periods;
   comparing the plurality of adjusted quiet periods corresponding to the plurality of sources to determine a common point in time without quiescing the replication that the replication appliance is responsible for; wherein the common point in time denotes that each of the plurality of sources was in a consistent state; and
   marking, retroactively, the determined common point in time as a consistent point in time in a journal.

2. The method of claim 1 wherein the replication appliance calculates the plurality of quiet periods by determining periods of time when no IO was received from the plurality of sources.

3. The method of claim 1 wherein each of the plurality of sources periodically sends the replication appliance a notification of a period of time within which no IO was sent to the respective one of the plurality of sources.

4. The method of claim 1 wherein each of the plurality of sources periodically sends the replication appliance a notification of a period of time during which no communication error occurred between the respective one of the plurality of sources and the replication appliance.

5. The method of claim 1 wherein the journal is used to record an IO split from the one or more of the plurality of sources.

6. The method of claim 1 wherein the replication appliance timestamps all IO written to the journal with a timestamp based on an internal clock of the data protection appliance.

7. A system for data replication, the system comprising:
   a replication appliance;
   a plurality of sources, wherein IO from the plurality of sources are sent to the replication appliance; and
   computer-executable logic operating in memory, wherein the computer-executable program logic is configured for retroactively determining a consistent point in time in a replication environment, comprising executing the steps of:
      receiving from each of the plurality of sources at the replication agent a plurality of quiet periods, wherein the plurality of quiet periods correspond to a period of time when no IO was received at a respective source among the plurality of sources;
      determining at the replication appliance a clock offset for each of the plurality of sources wherein the clock offset is measured with respect to the clock at the replication appliance;
      adjusting the plurality of quiet periods by at least one error adjusted quiet time, based on the clock offset for the corresponding source, in order to obtain a plurality of adjusted quiet periods;
      comparing the plurality of adjusted quiet periods corresponding to the plurality of sources to determine a common point in time without quiescing the replication that the replication appliance is responsible for; wherein the common point in time denotes that each of the plurality of sources was in a consistent state; and
      marking, retroactively, the determined common point in time as a consistent point in time in a journal.

8. The system of claim 7 wherein the replication appliance calculates the plurality of quiet periods by determining periods of time when no IO was received from the plurality of sources.

9. The system of claim 7 wherein each of the plurality of sources periodically sends the replication appliance a notification of a period of time within which no IO was sent to the respective one of the plurality of sources.

10. The system of claim 7 wherein each of the plurality of sources periodically sends the replication appliance a notification of a period of time during which no communication error occurred between the respective one of the plurality of sources and the replication appliance.

11. The system of claim 7 wherein the journal is used to record an IO split from the one or more of the plurality of sources.

12. The system of claim 7 wherein the replication appliance timestamps all IO written to the journal with a timestamp based on an internal clock of the data protection appliance.

13. A computer program product comprising:
   a non-transitory computer readable medium encoded with computer executable program code for replication of data, the replication of data further comprising retroactively determining a consistent point in time in a replication environment, the code configured to enable the execution of:
      receiving from each of the plurality of sources at the replication agent a plurality of quiet periods, wherein the plurality of quiet periods correspond to a period of time when no IO was received at a respective source among the plurality of sources;

determining at the replication appliance a clock offset for each of the plurality of sources wherein the clock offset is measured with respect to the clock at the replication appliance;

adjusting the plurality of quiet periods by at least one error adjusted quiet time, based on the clock offset for the corresponding source, in order to obtain a plurality of adjusted quiet periods;

comparing the plurality of adjusted quiet periods corresponding to the plurality of sources to determine a common point in time without quiescing the replication that the replication appliance is responsible for; wherein the common point in time denotes that each of the plurality of sources was in a consistent state; and marking, retroactively, the determined common point in time as a consistent point in time in a journal.

14. The computer program product of claim 13 wherein the replication appliance calculates the plurality of quiet periods by determining periods of time when no IO was received from the plurality of sources.

15. The computer program product of claim 13 wherein each of the plurality of sources periodically sends the replication appliance a notification of a period of time within which no IO was sent to the respective one of the plurality of sources.

16. The computer program product of claim 13 wherein each of the plurality of sources periodically sends the replication appliance a notification of a period of time during which no communication error occurred between the respective one of the plurality of sources and the replication appliance.

17. The computer program product of claim 13 wherein the journal is used to record an IO split from the one or more of the plurality of sources.

18. The computer program product of claim 13 wherein the replication appliance timestamps all IO written to the journal with a timestamp based on an internal clock of the data protection appliance.

* * * * *